(12) United States Patent
Minami

(10) Patent No.: US 7,163,580 B2
(45) Date of Patent: Jan. 16, 2007

(54) ALUMINUM FLAKE PIGMENT, PAINT COMPOSITION AND INK COMPOSITION CONTAINING THE SAME, AND FILMS THEREOF

(75) Inventor: Katsuhiro Minami, Nara (JP)

(73) Assignee: Toyo Aluminum Kabushiki Kaisha, Osaka (JP)

( * ) Notice: Subject to any disclaimer, the term of this patent is extended or adjusted under 35 U.S.C. 154(b) by 0 days.

(21) Appl. No.: 11/446,964

(22) Filed: Jun. 6, 2006

(65) Prior Publication Data

US 2006/0225533 A1  Oct. 12, 2006

Related U.S. Application Data

(62) Division of application No. 10/524,031, filed as application No. PCT/JP03/03026 on Mar. 13, 2003.

(51) Int. Cl.
C09C 1/64 (2006.01)
B22F 9/02 (2006.01)
B22F 9/04 (2006.01)

(52) U.S. Cl. ............... 106/404; 239/4; 241/15; 241/16; 241/24.11

(58) Field of Classification Search ............... 106/404; 239/4; 241/15, 16, 24.11
See application file for complete search history.

(56) References Cited

U.S. PATENT DOCUMENTS 2,678,879 A * 5/1954 Nuesch et al. ............ 75/255
2,678,880 A * 5/1954 Nuesch et al. ............ 75/354
3,776,476 A * 12/1973 Casey et al. ............... 241/15
3,901,688 A * 8/1975 Casey et al. ............. 428/687
4,065,060 A * 12/1977 Booz ......................... 241/16
4,115,107 A * 9/1978 Booz et al. ................ 75/354
4,236,934 A * 12/1980 Bell ......................... 106/404
4,469,282 A * 9/1984 Booz ......................... 241/16
4,484,951 A * 11/1984 Uchimura et al. ........ 106/404
4,629,512 A * 12/1986 Kondis ..................... 106/404
5,531,930 A * 7/1996 Karton et al. ........... 252/363.5

FOREIGN PATENT DOCUMENTS

| EP | 1 080 810 A1 | 3/2001 |
|---|---|---|
| JP | 10-1625 A | 1/1998 |
| JP | 10-152625 A | 6/1998 |
| JP | 2001-29877 A | 2/2001 |
| JP | 2003-82258 A | 3/2003 |
| JP | 2003-82290 A | 3/2003 |

* cited by examiner

Primary Examiner—Anthony Green
(74) Attorney, Agent, or Firm—Birch, Stewart Kolasch & Birch, LLP

(57) ABSTRACT

In order to provide an aluminum flake pigment having excellent metallic luster, fine-grainedness and a plating-like appearance presenting silvery classiness, an aluminum flake pigment, obtained by grinding aluminum powder in an organic solvent, having an average thickness (t) in the range of 0.025 μm to 0.08 μm and an average particle diameter ($D_{50}$) in the range of 8 μm to 30 μm is provided. This aluminum powder is preferably prepared by an atomized method. A ball mill is preferably used as a grinder for performing this grinding.

5 Claims, No Drawings

ALUMINUM FLAKE PIGMENT, PAINT COMPOSITION AND INK COMPOSITION CONTAINING THE SAME, AND FILMS THEREOF

This application is a Divisional of co-pending application Ser. No. 10/524,031 filed on Feb. 9, 2005, and for which priority is claimed under 35 U.S.C. § 120. Application Ser. No. 10/524,031 is the national phase of PCT International Application No. PCT/PCT/JP03/03026 filed on Mar. 13, 2003 under 35 U.S.C. § 371. The entire contents of each of the above-identified applications are hereby incorporated by reference.

TECHNICAL FIELD

The present invention relates to a metallic aluminum flake pigment. More specifically, the present invention relates to an aluminum flake pigment having excellent metallic luster, fine-grainedness and a plating-like appearance presenting silvery classiness.

The present invention also relates to a metallic paint composition, a metallic ink composition and films thereof each having excellent metallic luster, fine-grainedness and a plating-like appearance presenting silvery classiness.

BACKGROUND ART

In general, an aluminum flake pigment has been widely employed as a luster pigment blended into a paint composition or an ink composition in various fields of bodies of automobiles, motorcycles, bicycles and other vehicles and parts thereof, optical instruments such as cameras and video cameras, OA appliances, sporting goods, containers for food, beverages, cosmetics etc., audio products such as radio cassette recorders and CD players and domestic appliances such as cleaners, telephone sets and televisions or in the field of gravure printing, offset printing, screen printing etc.

While various types of aluminum flake pigments have heretofore been developed in various fields, an aluminum flake pigment having an average particle diameter in the range of 18 to 30 µm and an average thickness in the range of 0.5 to 1.5 µm or the like is frequently employed, as disclosed in Japanese Patent Laying-Open No. 10-1625, for example.

However, characteristics required to the aluminum flake pigment in these fields are improved year after year, and an aluminum flake pigment capable of obtaining a printing layer presenting classiness having excellent metallic luster, fine-grainedness and silvery plating-like luminance is demanded particularly in relation to gravure printing, offset printing, screen printing etc. Also in the field of paint compositions, an aluminum flake pigment capable of obtaining a film presenting classiness having plating-like luminance is strongly required.

In general, an aluminum evaporated flake pigment obtained by flakily pulverizing an evaporated aluminum thin film prepared by evaporating aluminum on a resin film with a thickness in the range of 0.02 to 0.06 µm and thereafter dissolving/removing this film has been used for satisfying such requirement.

However, this method is so inferior in productivity that the performance and the cost are unbalanced, and the working range thereof has been limited to narrow applications. When an aluminum flake pigment such as evaporated powder having a small thickness is to be prepared by conventional wet pulverization or grinding through a ball mill or the like (hereinafter simply referred to as grinding), the pigment is parted by pulverization before the thickness thereof is sufficiently reduced, and hence it has been impossible to obtain a sufficient plating-like film or ink by employing this aluminum flake pigment.

DISCLOSURE OF THE INVENTION

On the basis of the aforementioned present circumstances, the principal object of the present invention is to provide an aluminum flake pigment having excellent metallic luster, fine-grainedness and a plating-like appearance presenting silvery classiness.

Another object of the present invention is to provide an aluminum flake pigment having excellent metallic luster, fine-grainedness and a plating-like appearance presenting silvery classiness, which is manufacturable by wet-grinding atomized aluminum powder with a ball mill or the like to require a low manufacturing cost.

Still another object of the present invention is to provide a paint composition and an ink composition each having excellent metallic luster, fine-grainedness and a plating-like appearance presenting silvery classiness. In addition, a further object of the present invention is to provide a film having excellent metallic luster, fine-grainedness and a plating-like appearance presenting silvery classiness.

In order to solve the aforementioned problems, the inventors have detailedly studied the relation between the shape, the surface smoothness, the average particle diameter, the particle diameter distribution, the average thickness, the thickness distribution, the aspect ratio etc. of an aluminum flake pigment and the reflectance etc. of a film containing this aluminum pigment.

Consequently, the inventors have found that a film having excellent metallic luster, fine-grainedness and a plating-like appearance presenting silvery classiness can be obtained with an aluminum flake pigment having a specific average particle diameter and a specific average thickness. They have also studied a method of manufacturing such an aluminum pigment, to find that the aluminum flake pigment can be manufactured at a low manufacturing cost by wet-grinding aluminum powder prepared by an atomized method with a ball mill or the like, for completing the present invention.

The present invention is directed to an aluminum flake pigment, obtained by grinding aluminum powder in an organic solvent, having an average thickness (t) in the range of 0.025 µm to 0.08 µm and an average particle diameter ($D_{50}$) in the range of 8 µm to 30 µm. This aluminum powder is preferably aluminum powder manufactured by atomization method.

The present invention includes a paint composition containing this aluminum flake pigment, a binder and a solvent. Further, the present invention includes an ink composition containing this aluminum flake pigment, a binder and a solvent.

The present invention includes a film obtained by applying this paint composition to a base and thereafter drying the same. In addition, the present invention includes a film obtained by printing this ink composition on a base and thereafter drying the same.

BEST MODES FOR CARRYING OUT THE INVENTION

The present invention is now described in more detail with reference to an embodiment.

The present invention provides an aluminum flake pigment having an average thickness (t) in the range of 0.025 μm to 0.08 μm and an average particle diameter ($D_{50}$) in the range of 8 μm to 30 μm.

<Average Thickness of Aluminum Flake Pigment>

The average thickness (t) of aluminum flake pigment particles must be in the range of 0.025 to 0.08 μm and is preferably in the range of 0.04 to 0.07 μm, so that the inventive aluminum flake pigment has excellent metallic luster, fine-grainedness and a plating-like appearance presenting silvery classiness.

If the average thickness exceeds 0.08 μm, smoothness on the surfaces of the aluminum flake pigment particles is so insufficient that the metallic luster is reduced, the pigment falls short of opacifying power, fine-grainedness of a printed surface or a film is not remarkably distinguishable from that of a conventional metallic pigment and no plating-like finishing presenting silvery classiness can be attained.

If the average thickness is less than 0.025 μm, on the other hand, strength of the aluminum flake pigment particles is so reduced that the aluminum flake pigment particles are frequently broken or bent during preparation of a paint composition or an ink composition to hinder formation of a sound printing layer or a sound film, while an excessive time is required for grinding to substantially prevent production.

The average thickness employed in this specification has been decided by measurement with an atomic force microscope.

<Average Particle Diameter of Aluminum Flake Pigment>

The average particle diameter ($D_{50}$) of the inventive aluminum flake pigment must be in the range of 8 to 30 μm, and is preferably in the range of 10 to 25 μm. An aluminum flake pigment having a small average particle diameter generally tends to hardly attain high brightness. Therefore, neither strong metallic luster nor high reflectance can be obtained if the average particle diameter is less than 8 μm, while no fine-grainedness of a printed surface or a film is obtained and granularity or glitter is too enhanced to attain plating-like finishing presenting silvery classiness if the average particle diameter exceeds 30 μm.

The average particle diameter employed in this specification has been measured with Microtrac HRA by Honeywell Inc.

<Raw Aluminum Powder>

Atomized aluminum powder employed as the raw material for the inventive aluminum flake pigment is aluminum powder obtained by well-known atomization method and an atomizing medium therefor is not particularly restricted but air, nitrogen, argon gas, carbon dioxide gas, helium gas or a gas mixture containing at least one of these gases can be employed, for example. Further, a liquid such as water can also be employed as the atomizing medium. Aluminum powder obtained by atomization method employing argon gas or nitrogen gas among these atomizing media is particularly preferable.

The shape of the atomized aluminum powder employed in the present invention is not particularly restricted but may be any of spherical, flat, platelike, teardrop, needlelike, spheroidal and indeterminate shapes, while a shape closer to a spherical one is preferable.

The content of oxygen in this aluminum powder is preferably not more than 0.5 percent by mass, depending on the particle diameter and the shape of this aluminum powder. If the oxygen content exceeds 0.5 percent by mass, an oxide film tends to be so strong that it is difficult to manufacture thin flakes due to reduction of ductility.

Further, purity of this aluminum powder excluding oxygen is not particularly restricted but the aluminum powder may be prepared from pure aluminum or a well-known aluminum alloy. In consideration of the luster of a film or printed matter, however, it is preferable to use ordinary pure aluminum, more preferably pure aluminum of at least 99.9 percent by mass in purity.

As to the size of this aluminum powder, the average particle diameter is preferably in the range of 1 to 10 μm, more preferably in the range of 2 to 8 μm. It tends to be difficult to flake this aluminum powder by grinding if the average particle diameter is less than 1 μm, while the grinding time may be so extremely lengthened that the luster is reduced if the average particle diameter exceeds 10 μm.

<Method of Manufacturing Aluminum Flake Pigment>

A method of manufacturing the inventive aluminum flake pigment is not particularly restricted but the same can be manufactured by a well-known method, while it is preferable to use atomized aluminum powder as the raw material and perform grinding for at least 10 hours with a ball mill under the presence of an organic solvent.

While well-known industrial grinding balls can be used as a grinding medium used in the ball mill employed in the method of manufacturing the inventive aluminum flake pigment, steel balls or stainless balls having diameters in the range of 0.3 to 4 mm, for example, can be preferably used.

The quantity of the grinding balls is preferably in the range of 40 to 150 parts by mass with reference to 1 part by mass of the aluminum powder in general, depending on the size and the rotational frequency of the ball mill. The rotational frequency (also referred to as a rotational speed in general), properly varied with the size of the ball mill, the material for the balls, the diameters of the balls, the quantity of the balls etc., is preferably in the range of 30 to 95% of the critical rotational frequency in general.

As the method of manufacturing the inventive aluminum flake pigment, a method employing a two-stage grinding system of further continuously grinding a filter cake obtained by temporarily grinding raw aluminum powder in a ball mill and solid-liquid separating the same with a filter press or the like is preferable. It is preferable to efficiently elongate the raw aluminum powder to a certain degree in the first-stage grinding and to change grinding conditions to those different from the first-stage grinding conditions in the second-stage grinding, in order to avoid parting of aluminum particles during flaking and further efficiently flake the particles. More specifically, it is possible to progress flaking while avoiding parting of the aluminum particles during flaking by reducing the diameters of the grinding balls or increasing the quantity of the organic solvent for grinding in the second-stage grinding.

While a grinding assistant employed in the method of manufacturing the inventive aluminum flake pigment is not particularly restricted but a well-known one is usable, higher fatty acid such as lauric acid, myristic acid, palmitic acid, stearic acid, arachic acid or behenic acid, unsaturated higher fatty acid such as oleic acid, higher aliphatic amine such as stearic amine, higher aliphatic alcohol such as stearyl alcohol or oleyl alcohol, higher fatty amide such as stearic acid amide or oleic amide, higher fatty metal salt such as aluminum stearate or aluminum oleate or the like can be listed.

This grinding assistant is preferably used in the range of 0.1 to 10 percent by mass with respect to the raw aluminum powder, and further preferably used in the range of 0.2 to 5 percent by mass. If the content of the grinding assistant is less than 0.1 percent by mass, the grinding assistant tends to be so insufficient that aluminum particles flocculate in the process of flaking when the specific surface area of the raw aluminum powder is increased due to grinding. If the content of the grinding assistant exceeds 10 percent by mass, on the other hand, the appearance or durability of the film or the printing layer may be badly influenced.

While a grinding solvent employed in the method of manufacturing the inventive aluminum flake pigment is not particularly restricted but a well-known solvent is usable, a hydrocarbon solvent such as mineral spirit, solvent naphtha or an alcoholic, etheric, ketonic or ester solvent can be preferably used, for example. Among the said solvents, employment of a high boiling point hydrocarbon solvent such as mineral spirit or solvent naphtha is particularly preferable in consideration of safety. Further, the quantity of the grinding solvent with respect to 100 parts by mass of raw aluminum powder is preferably in the range of 250 to 2000 parts by mass.

In the method of manufacturing the inventive aluminum flake pigment, the grinder is not restricted to only the ball mill as described above but the aluminum flake pigment can also be preferably manufactured through a well-known grinder such as an attriter or a vibration mill.

While the inventive aluminum flake pigment is frequently blended into a solvent such as mineral spirit, solvent naphtha, toluene or ethyl acetate for sale or distribution, it is also possible to remove the solvent for distributing the aluminum flake pigment or the aluminum flake pigment can be wet-treated with a small quantity of solvent to be put on the market.

<Paint Composition and Ink Composition>

The inventive aluminum flake pigment can be blended into a paint composition, an ink composition, a rubber composition, a plastic composition or an elastomer composition for providing a plating-like appearance having excellent metallic luster, fine-grainedness and silvery classiness to the composition.

Each of the inventive paint composition and the inventive ink composition contains the inventive aluminum flake pigment, a solvent and a binder. The inventive aluminum flake pigment is preferably blended into each of the inventive paint composition and the inventive ink composition in the range of 0.1 to 30 percent by mass. Another color pigment or dye can be added to each of the inventive paint composition and the inventive ink composition if necessary.

While the solvent employed for each of the inventive paint composition and the inventive ink composition is not particularly restricted but a well-known solvent can be used, aliphatic hydrocarbon such as mineral spirit, hexane, heptane, cyclohexane or octane, aromatic hydrocarbon such as benzene, toluene or xylene, halogenated hydrocarbon such as chlorobenzene, trichlorobenzene, perchloroethylene or trichloroethylene, alcohol such as methanol, ethanol, n-propyl alcohol or n-butanol, ketone such as n-propanone or 2-butanone, ester such as ethyl acetate or propyl acetate, ether such as tetrahydrofuran, diethyl ether or ethyl propyl ether or oil of turpentine can be listed. This solvent can be used solely or in the form of a mixture of at least two solvents.

While the solvent is an organic solvent in the aforementioned description, the solvent used for each of the inventive paint composition and the inventive ink composition may be water. In this case, the inventive aluminum flake pigment is covered with a resin composition or a phosphoric compound to be blended with a binder and water for providing a water-based paint composition or ink composition.

While the binder used for each of the inventive paint composition and the inventive ink composition is not particularly restricted but well-known film-forming resin or the like can be preferably employed, acrylic resin, polyester resin, alkyd resin or fluorocarbon resin can be listed, and the binder can also be used along with a crosslinking agent such as amino resin or block polyisocyanate resin. In addition to the resin, lacquer hardened by natural seasoning, two-pack polyurethane resin or silicone resin can also be used. In the binder employed for the inventive ink composition, oil such as linseed oil or castor oil, phenolic resin, or natural resin such as rosin or the like can be properly blended if necessary. This binder can be used solely or in the form of a mixture of at least two binders.

While the color pigment addable to each of the inventive paint composition and the inventive ink composition is not particularly restricted but a well-known color pigment can be added to a degree not damaging the characteristics of the present invention, an organic pigment such as quinacridone red, phthalocyanine blue, phthalocyanine green, isoindolinone yellow, carbon black, perylene or azo lake or an inorganic pigment such as iron oxide, titanium oxide, cobalt blue, flowers of zinc, ultramarine blue, chromium oxide, mica or chrome yellow can be preferably used. This color pigment is not restricted to one but at least two color pigments may be mixed with each other or simultaneously added.

Further, an ultraviolet absorber, a thickener, a static remover, a dispersant, an antioxidant, a glazing agent, a surface active agent, a synthetic preserver, a lubricant, a plasticizer, a hardener, a reinforcing agent such as a filler or wax may be added to each of the inventive paint composition and the inventive ink composition if necessary.

<Method of Applying Paint Composition and Method of Printing Ink Composition>

A well-known method can be employed as a method of applying the inventive paint composition, and brush application, spraying, a doctor blade method, roll coating or a bar coater method can be listed. Further, intaglio plate printing such as gravure printing, letterpress printing or planographic printing such as offset printing (also referred to as transfer printing) or screen printing can be listed as a method of performing printing with the inventive ink composition.

While a base coated with each of the inventive paint composition and the inventive ink composition is not particularly restricted but any article allowing application of the paint composition can be preferably employed, the body of an automobile, a motorcycle, a bicycle or another vehicle or parts thereof, an optical instrument such as a camera or a video camera, an OA appliance, sporting goods, a container for a cosmetic or the like, an audio product such as a radio cassette recorder or a CD player, a domestic appliance such as a cleaner, a telephone set or a television or the like can be listed.

While the material for this base is not restricted either but a well-known one can be employed, an inorganic material such as ceramics, glass, cement or concrete, a plastic material such as natural resin or synthetic resin, metal, wood, paper or the like can be listed.

While the present invention is now described in more detail with reference to Examples, the present invention is not restricted to these.

EXAMPLE 1

A blend consisting of 1 kg of atomized aluminum spherical powder of 3 μm in average particle diameter, 6 L of mineral spirit and 100 g of oleic acid was charged into a ball mill of 500 mm in inner diameter and 180 mm in length, and first-stage grinding was performed with 50 kg of steel balls of 1.8 mm in diameter at 33 rpm (corresponding to 55% of the critical rotational frequency) for 8 hours.

After the first-stage grinding, slurry in the ball mill was washed out with the mineral spirit and solid-liquid separated through a pan filter. From the obtained filter cake (nonvolatile content: 85%), 500 g in terms of aluminum metal was returned to the same type of ball mill containing 50 kg of steel balls of 1.5 mm in diameter with further addition of 5 L of mineral spirit and 100 g of oleic acid, to be subjected to second-stage grinding at 40 rpm (corresponding to 67% of the critical rotational frequency) for 20 hours.

After termination of the second-stage grinding, slurry in the ball mill was washed out with the mineral spirit and successively passed through screens of 400 meshes and 500 meshes, so that the obtained cake was transferred to a kneader mixer for obtaining paste containing an aluminum flake pigment having a nonvolatile content of 30%.

EXAMPLE 2

Conditions identical to those in Example 1 were employed except that second-stage grinding was performed with steel balls of 1.0 mm in diameter, for obtaining paste containing an aluminum flake pigment.

EXAMPLE 3

Conditions identical to those in Example 1 were employed except that atomized aluminum spherical powder of 5 μm in average particle diameter was used as the raw material, for obtaining paste containing an aluminum flake pigment.

EXAMPLE 4

Conditions identical to those in Example 1 were employed except that atomized aluminum spherical powder of 5 μm in average particle diameter was used as the raw material and second-stage grinding was performed with steel balls of 1.0 mm in diameter, for obtaining paste containing an aluminum flake pigment.

EXAMPLE 5

Conditions identical to those in Example 1 were employed except that second-stage grinding was performed for 30 hours, for obtaining paste containing an aluminum flake pigment.

COMPARATIVE EXAMPLE 1

Conditions identical to those in Example 1 were employed except that second-stage grinding was performed for 8 hours, for obtaining paste containing an aluminum flake pigment.

COMPARATIVE EXAMPLE 2

Conditions identical to those in Example 1 were employed except that atomized aluminum spherical powder of 10 μm in average particle diameter was used as the raw material, for obtaining paste containing an aluminum flake pigment.

COMPARATIVE EXAMPLE 3

As comparative example, Metasheen KM 1000 (aluminum evaporated flake pigment) by Toyo Aluminum K.K. was employed and used as an aluminum flake pigment as such with no particular processing.

<Evaluation Results>

The average thickness, the average particle diameter and the manufacturing cost of each of the aluminum flake pigments obtained in Examples 1 to 5 and comparative examples 1 to 3 and the reflectance of a film of a paint composition containing each aluminum flake pigment were measured according to the following measuring methods (i) to (iii) and evaluated. Table 1 shows the evaluation results.

(i) Method of Measuring Average Thickness: t (μm)

Aluminum paste containing the aluminum flake pigment or the aluminum flake pigment is sufficiently cleaned with acetone and thereafter sufficiently dried for obtaining aluminum powder. The obtained aluminum powder was homogeneously dispersed on a glass plate, and the thicknesses of 10 particles were measured with a probe microscope (Nanopics 1000 by Seiko Instruments Inc.) for obtaining the average thickness from the average thereof (ii) Method of Measuring Average Particle Diameter: $D_{50}$ (μm)

A mixture having the following composition was stirred with a glass rod, introduced into circulating water in the system of measurement of a laser diffraction particle diameter distribution measuring apparatus (Microtrac HRA) and dispersed with ultrasonic waves for 30 seconds, to be thereafter subjected to measurement:

aluminum paste: 0.5 g
Triton x-100 (*1): 1.0 g
ethylene glycol: 5.0 g

In the above composition, the item denoted by *1 is a nonionic surface active agent by Union Carbide Corporation.

(iii) Method of Measuring Reflectance (%) of Film

A mixture consisting of the following composition is stirred with a glass rod, thereafter sprayed to an aluminum plate with an air pressure of 1.0 kg/cm² and subjected to baking at 80° C. for 20 minutes, for measuring the gross with a gross meter (TC-108DP by Tokyo Denshoku Co., Ltd.) at an incident angle of 60° and an acceptance angle of 60°:

aluminum flake pigment: 1.0 g (in terms of metal)
Polytac 3000 (*2): 6.67 g
Polytac Thinner (*2): 100 g In the above composition, items denoted by *2 are acrylic lacquer clear resin by Toho Kaken Manufacturing Inc.

TABLE 1

| | Thickness (μm) of Particles of Aluminum Flake Pigment | Average Particle Diameter (μm) of Aluminum Flake Pigment | Reflectance (%) of Film |
|---|---|---|---|
| Example 1 | 0.045 | 12.8 | 80 |
| Example 2 | 0.063 | 13.8 | 84 |
| Example 3 | 0.050 | 16.3 | 92 |
| Example 4 | 0.060 | 18.9 | 74 |
| Example 5 | 0.030 | 10.1 | 82 |
| Comparative Example 1 | 0.103 | 13.1 | 61 |
| Comparative Example 2 | 0.513 | 32.3 | 52 |
| Comparative Example 3 | 0.025 | 11.1 | 115 |

As shown in the above Table 1 of evaluation results, the films employing paints containing the aluminum flake pigments according to Examples 1 to 5 are clearly higher in reflectance as compared with comparative examples 1 and 2 and exhibit values extremely close to that in the case of employing the aluminum evaporated flake pigment according to comparative example 3, although the former do not reach the latter.

The embodiment and Examples disclosed this time must be considered as illustrative and not restrictive in all points. The scope of the present invention is shown not by the above description but by the scope of claim for patent, and it is intended that all modifications within the meaning and range equivalent to the scope of claim for patent are included.

INDUSTRIAL AVAILABILITY

According to the aforementioned evaluation results, the inventive aluminum flake pigment has such high reflectance that even an extremely thin film is excellent in metallic luster and fine-grained and can obtain silvery plating-like luster presenting classiness, and is manufactured through no evaporation process, to be suitably mass-produced at a low cost.

Each of the paint composition and the ink composition using the inventive aluminum flake pigment has such high reflectance that even an extremely thin film or printing layer is excellent in metallic luster and fine-grained and can obtain silvery plating-like luster presenting classiness.

Further, each of the film and the printing layer using the inventive aluminum flake pigment has such high specular reflectance that the same is excellent in metallic luster and fine-grained and can obtain silvery plating-like luster presenting classiness.

The invention claimed is:

1. A manufacturing method of an aluminum flake pigment, having an average thickness (t) in the range of 0.025 µm to 0.08 µm, and an average particle diameter ($D_{50}$) in the range of 8 µm to 30 µm, said manufacturing method comprising:

a first step of preparing aluminum powder having an average particle diameter in the range of 1 µm to 10 µm by an atomization method, and a second step of grinding said aluminum powder in an organic solvent, wherein said second step is performed using a grinding medium having a diameter in the range of 0.3 mm to 4 mm.

2. The manufacturing method of an aluminum flake pigment according to claim 1, wherein said second step is performed for at least 10 hours.

3. The manufacturing method of an aluminum flake pigment according to claim 1, wherein said second step is performed for at least 28 hours.

4. The manufacturing method of an aluminum flake pigment according to claim 1, wherein the content of oxygen in said aluminum powder is not more than 0.5% by mass.

5. The manufacturing method of an aluminum flake pigment according to claim 1, wherein said second step is performed by a two-stage grinding system of further continuously grinding after said aluminum powder is ground and solid-liquid separated.

* * * * *